April 26, 1938.  L. DE FLOREZ ET AL  2,115,665

APPARATUS FOR TEMPERATURE CONTROL

Filed Sept. 14, 1934  2 Sheets-Sheet 1

Luis de Florez
James W. Gray
Emmon Bach
INVENTORS

BY R. J. Dearborn their ATTORNEY

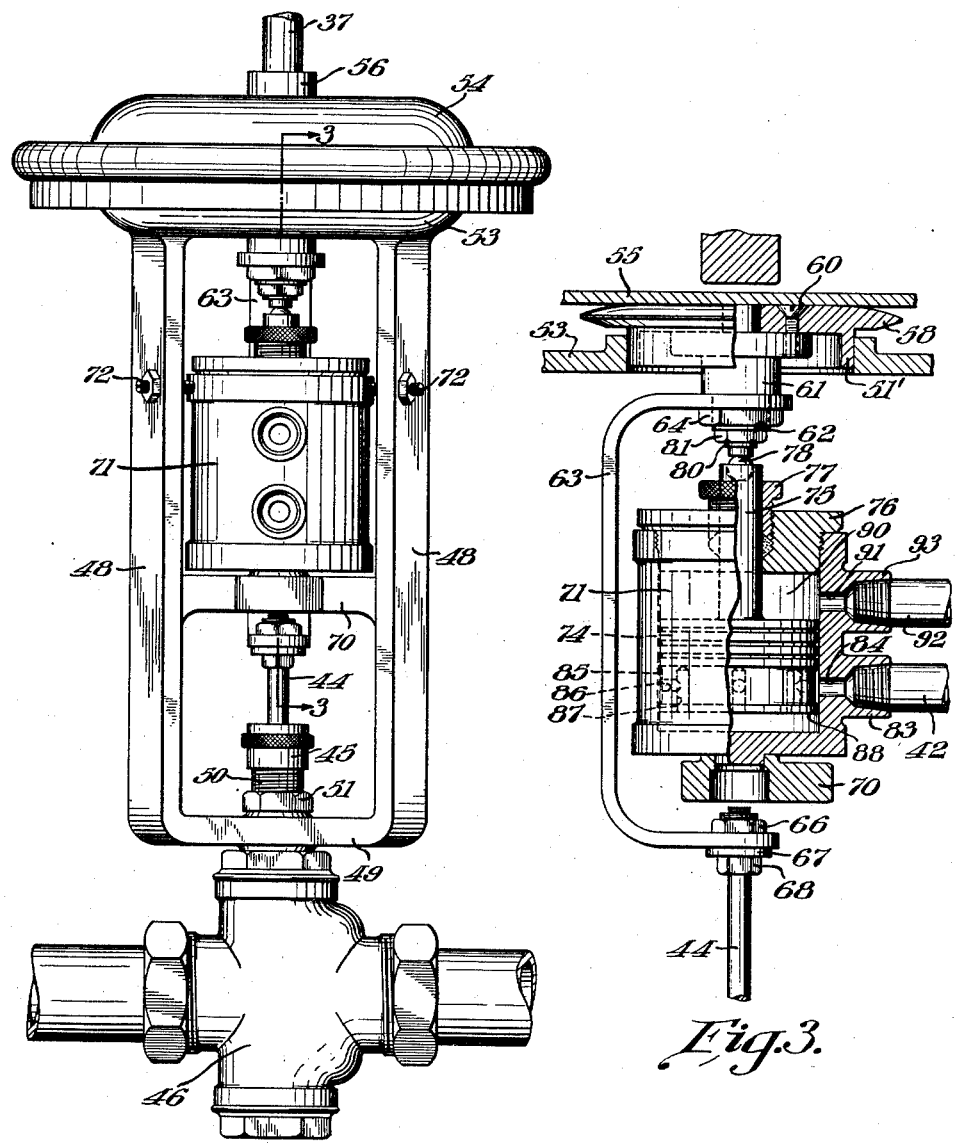

Patented Apr. 26, 1938

2,115,665

UNITED STATES PATENT OFFICE 2,115,665

APPARATUS FOR TEMPERATURE CONTROL

Luis de Florez, Pomfret, Conn., James W. Gray, Mountain Lakes, N. J., and Emmon Bach, Yonkers, N. Y., assignors to The Texas Company, New York, N. Y., a corporation of Delaware Application September 14, 1934, Serial No. 743,948

2 Claims. (Cl. 236—1)

This invention relates to temperature control for a fluid heater, and more particularly to a control for a tube still heater of the type adapted to heat oil for cracking or distillation purposes.

In the operation of a fluid heater or tube still of this character, it is known to control the temperature of the oil or fluid being heated, by regulating the supply of fuel to the burner which heats the fluid. This may be accomplished by a regulating valve in the fuel line which is adjusted in accordance with the temperature of the fluid being heated at a selected point in its path of flow. The valve may determine the pressure of the fuel in the fuel line, and this in turn determines the quantity of fuel supplied to the burner. Such a system is usually dependent upon the operation of a pump or other device supplying fuel at a constant pressure to the fuel line. However, in commercial practice, it is found difficult if not impossible to control the operation of the pump or other device so as to provide a constant outlet pressure. This is particularly true of a system employing liquid fuel, such as a fuel oil, in which a liquid pump supplies the fuel to the fuel line. Such variations in pressure attributable to the pump, or to other outside sources independent of the temperature control referred to above, disturb the operation, and result in marked increases or decreases in the temperature of the furnace. Inasmuch as there is a time lag between the variation in the supply of fuel to the burner resulting from such local variations in pressure, and the temperature change of the oil adjacent the outlet of the tube still where the temperature control is generally located, the net result is a pronounced fluctuation or hunting action of the regulator from one side of normal to the other, giving an irregular control which shows up on a temperature control chart as a jagged line of peaks and dips.

It is an object of the present invention to provide a temperature control for a fluid heater or tube still of this character, in which a more even heating of the oil or fluid is secured, and in which local variations in pressure in the fuel line are rapidly compensated so that they are ineffective to cause marked temperature changes in the fluid being heated.

Another object of the invention is to provide a temperature control of this character which is particularly applicable to a system employing a liquid fuel, such as a fuel oil, and in which an even and accurate regulation is effected in a simple and economical manner.

Still another object of the invention is to provide improved pressure actuated valve mechanism which is adapted for use in a control system of this character, and which enables the control of a liquid, such as a fuel oil, flowing under high pressure, by a temperature controller using a control fluid at a relatively lower pressure, and in which objections due to corrosion or other deleterious action of the fuel on the control mechanism are overcome.

Other objects and advantages of the invention will be apparent from the following description when taken in connection with the accompanying drawings and appended claims.

In the drawings, which illustrate a preferred embodiment of the invention,

Fig. 1 is a diagrammatic view of a tube still employing the temperature control of the present invention;

Fig. 2 is a side elevational view of the pressure actuated valve mechanism employed in the temperature control of the present invention; and Fig. 3 is a partial vertical sectional view taken on the plane of the line 3—3 of Fig. 2.

Referring to the drawings, a tube still is indicated at 10 having the usual furnace equipped with burners 11, and a heating coil 12 which may be positioned within the radiant or convection sections, and both sections of the furnace, in the usual manner. Oil to be heated is supplied from pipe 13 by pump 14 under pressure through line 15 to the coil 12; and the heated oil is discharged through line 16 having control valve 17 to a suitable treating chamber (not shown), which may be a soaking drum, flash distillation tower or other suitable treating device as is customarily employed.

Fuel oil for combustion purposes is supplied from tank 20 through line 21 to pump 22, which forces it under pressure through line 23 containing throttle valve 24 to a series of branch lines 25 leading to the burners 11. In each branch line is a needle valve 26 providing restricted communication of the fuel line 23 with each of the burners, so that the pressure within the fuel line determines the quantity of fuel supplied thereto. The burners may be of any suitable type, that shown being of the atomizing type having a valve controlled steam connection 27.

Positioned within line 23 beyond the burners is a pressure operated valve 30 which regulates the pressure within the fuel line intermediate valves 24 and 30, thereby controlling the supply of fuel to the burners. A return line 31 leads from valve 30 back to line 21 on the suction side of pump 22, so that excess fuel is returned for recirculation. The pump 22 may operate at a constant rate so as to normally supply an excess of fuel to the line 23 over that required for combustion purposes at the burners 11. The proportion of the fuel supplied to the burners is controlled by the setting of the valve 30, which regulates the pressure within the fuel line supplying the burners; and the excess or balance of the fuel is returned by line 31 for recirculation. Where a throttle valve 24 is employed, so that the pressure within the line between the valves 24 and 30 determines the supply to the burners, a pressure control on the prime mover driving the pump 22 may or may not be used as desired. If used, it is to be understood that the pump 22 is driven at a variable rate as determined by the pressure in the fuel line between pump 22 and valve 24, such as by a steam engine whose steam supply is regulated in response to pressure within the fuel line in conventional manner. If the throttle valve 24 is omitted, then the pressure controlled portion of the fuel line extends from the pump 22 to the valve 30, and a pressure control for the prime mover of pump 22 is omitted, as the pressure regulated valve 30 and control therefor effect the desired regulation.

For control of the pressure operated valve 30, pressure control fluid, such as compressed air, is supplied through line 35 from a suitable source of supply to a temperature controller 36 and thence through line 37 to the pressure actuated valve. A pyrometer 38 positioned adjacent the outlet of heating coil 12 so as to be responsive to the temperature of the oil at this point, is connected by leads 39 and 40 to the control mechanism of the controller 36, so as to regulate the supply and pressure of the control fluid to the valve 30, to maintain a predetermined temperature at the outlet of the heating coil. Should the temperature of the oil at this selected point increase beyond a predetermined normal, the controller then functions to decrease the pressure of air or control fluid in line 37, which allows valve 30 to move upwardly toward fully open position to thereby allow a freer flow of fuel to the return line 31, thus decreasing the pressure within line 23 and accordingly decreasing the quantity of fuel supplied to the burners. Conversely, upon a decrease in oil temperature at pyrometer 38 below a predetermined normal, controller 36 acts to increase the fluid pressure in line 37, moving valve 30 downwardly toward closed position, thereby increasing the pressure within line 23 and increasing the supply of fuel to the burners. Temperature controllers of this type, which function to control the flow or pressure of a control fluid in accordance with temperature variation in another fluid being heated are known,—for example, see the patent to de Florez No. 1,768,353, dated June 24, 1930. As any suitable conventional type of temperature controller may be employed, no further description of such an instrument is thought necessary. While the controller is shown as responsive to the temperature of the oil adjacent the heater outlet, it is to be understood that it may be made responsive to the temperature of the oil at any other point in its path of flow by a suitable positioning of the pyrometer, or to the temperatures of the oil at several different points in its path of flow by an arrangement of pyrometers connected in series as is well understood.

In case of a local variation in pressure in line 23, such as is commonly produced by variation in the operation of pump 22, this tends to modify the quantity of fuel passing to the burners 11, irrespective of the temperature control. This results in an increase or decrease in the temperature of the oil passing through coil 12; and after a time lag sufficient for the temperature increase to be communicated to the pyrometer 38, the temperature control then operates to make a correction for the variation. In practice, it is found that this operation may cause an irregular temperature control or hunting. In accordance with the present invention, a pressure line 42 is provided from the fuel line 23 on the burner side of valve 30, to the pressure actuating mechanism of the valve 30. The pressure of line 23 is thereby communicated so as to act on the valve 30 in the opposite direction of its movement from that of the control fluid 37. Any local variation in pressure in line 23 is thereby instantly communicated to the pressure actuating mechanism of the valve 30 to compensate for such local variations in pressure which arise independently of the temperature control. For example, an increase in pressure in line 23 for a constant temperature at pyrometer 38 moves valve 30 upwardly toward fully open position, thereby rapidly decreasing the pressure in line 23 to bring it back to predetermined normal. Conversely, a local decrease in pressure in line 23, communicated through line 42, disturbs the pressure balance of the valve actuating mechanism, and allows the then overbalancing pressure of line 37 to move valve 30 downwardly toward closing position, which restores the predetermined pressure in line 23. The net result is that local variations in pressure in the fuel line supplying the burners are so rapidly compensated that very slight increases or decreases in temperature of the oil being heated occur as a result of such local pressure variations, such that a temperature control chart produced in actual operations approaches more nearly a straight line free from jagged peaks and dips.

It is also to be understood that the pressure operated valve 30 may be positioned between pump 22 and the burners, with a throttle valve between the burners and return line 31. In such case, the pressure line 42 leads from the fuel line 23 between the valve 30 and the burners, and the valve is so constructed that a decrease in pressure above the diaphragm allows the valve to move toward closed position to restrict the flow of fuel to the burners, and vice versa; and a local increase in pressure in line 23 communicated by pressure line 42 below the diaphragm moves valve 30 toward closed position to restrict the flow of fuel past the valve to line 23, and vice versa.

The temperature controller 36 is coordinated with the pressure compensating control 42, so that the temperature control functions in the normal manner to maintain a substantially constant outlet temperature of the oil being heated. Thus, for a temperature change at pyrometer 38, the fluid pressure in line 37 is altered, which changes the positioning of valve 30 and accordingly changes the pressure in line 23. Such change in pressure communicated through the pressure line 42 would tend to further alter the positioning of valve 30, provided the temperature controller 36 has its usual setting which tends to maintain a substantially constant outlet temperature when the pressure compensating line 42 is not employed. However, when the temperature controller 36 is properly coordinated with the compensating line 42, then any change in setting of the controller for a variation in temperature at pyrometer 38 results in such increase or decrease in the pressure of control fluid in line 37 as to also compensate for the resulting change in pressure in line 23 communicated through the pressure control line 42. Consequently, a new position of pressure equilibrium is attained.

In a fuel supply system for a tube still of this character, where a liquid fuel such as fuel oil is employed, it is customary to force the liquid fuel through the fuel line under high pressure. It is of course possible to employ a correspondingly high pressure control fluid to balance the pressure in the fuel line, but this is uneconomical as requiring the employment of greater compressor capacity, larger or stronger communicating lines and diaphragms and the like. Moreover, it is found that a fuel oil results in rapid deterioration of the customary flexible diaphragms, necessitating frequent replacement. These objections are effectively overcome in accordance with the present invention by the provision of pressure actuating mechanism for the valve 30 as illustrated in Figs. 2 and 3.

Referring thereto, the stem of the valve 30 is indicated at 44, passing through a suitable stuffing box 45 from the interior of the valve casing 46. Mounted on the upper portion of the valve casing is a frame consisting of diametrically opposed arcuate walls 48 connected at their lower ends by a base or cross piece 49 having a suitable opening which straddles the upstanding exteriorly threaded boss 50 attached to the valve casing 46 and through which the stem 44 passes. The frame is held in place by a nut 51 threaded on boss 50. The upper portions of the walls 48 are connected by a casing member 53, to which is fastened an upper casing member 54, the casing members being hollow to provide a chamber within which the diaphragm 55 operates. This diaphragm is clamped about its periphery between the casing members 53 and 54. Casing 54 has an internally threaded boss 56 within which pipe 37 is mounted so as to supply control fluid to the space above diaphragm 55. The latter bears against a circular plate 58 carrying a downwardly depending cylindrical wall 51' which slidably engages within a machined opening formed in the lower central portion of casing member 53. Attached to plate 58 by suitable screws 60 is a depending boss 61 having an exteriorly threaded lower end of smaller overall diameter, as indicated at 62. The upper end of a bridge or yoke member 63 has an opening receiving the threaded extension 62, and this yoke is clamped in place against the shoulder of boss 61 by nut 64. The lower portion of yoke 63 is provided with an opening receiving the exteriorly threaded upper end of valve stem 44, and is mounted in place thereon between adjustable nut 66 and sleeve 67 which is locked in position by nut 68. The diaphragm 55 is thus operably connected with the valve stem 44 so that fluid pressure above the diaphragm tends to force the valve stem downwardly to move valve 30 toward closing position. Adjustment of the connection between the diaphragm and valve stem 44 is afforded by suitable adjustment of nut 66, and the parts may then be locked in adjusted position by nut 68.

Mounted between walls 48 is a cross brace 70 forming a seat for a cylinder 71 positioned within the arcuate walls 48. As shown, the cylinder is clamped between adjustable screw guides 72 threaded within the walls 48, although it may be mounted in place in any other suitable manner. It is not essential that the cylinder be rigidly clamped to the frame, inasmuch as the pressure acting on the cylinder tends to at all times maintain it against the seat formed in brace 70. Operating within cylinder 71 is a piston 74 attached to a stem 75 which extends through an opening in the removable head 76, closed by a suitable stuffing box 77. The upper end of stem 75 is provided with a socket within which is mounted a ball 78 adapted to bear against the head of a screw 80 which is threaded within an interior bore of boss 61. The screw 80 may be adjusted so as to adjust the operable connection between the piston and valve stem 44, as transmitted through the boss 61 and yoke 63, and is then locked in adjusted position by lock nut 81.

Cylinder 71 carries an interiorly threaded boss 83 adjacent the lower end thereof, within which is mounted the end of pipe 42 forming the pressure connection from the fuel line 23. The cylinder wall is provided with an opening 84 in alignment with pipe 42 so as to supply the liquid fuel oil to the interior of cylinder 71 beneath piston 74. The piston is formed with an annular groove 85 opposite opening 84, providing an annular chamber which is connected by a plurality of radial ports 86 with corresponding longitudinal bores 87 which open at their lower ends within the confined space of cylinder 71 beneath piston 74. This construction is provided to enable the piston 74 to be extended so as to have an additional guiding surface 88 against the cylinder wall, thereby stabilizing the movement of the piston; but of course any other suitable construction can be employed, such as a pipe connection opening directly beneath the piston 74.

Pressure fluid introduced by pipe 42 thus acts upwardly on piston 74, and consequently downwardly on cylinder 71 tending to maintain the cylinder on its seat in brace 70. Upward movement of piston 74 is communicated through stem 75, ball 78, screw 80, boss 61 and yoke 63 to the valve stem 44, tending to move the valve upwardly toward fully open position. Any leakage of liquid fuel past the piston rings of piston 74 is discharged from the chamber 90 above the piston through port 91 and pipe 92 mounted within an internally threaded boss 93. As shown in Fig. 1, the pipe 92 may communicate with the return line 31 beyond valve 30 which communicates with the suction side of pump 22, so that such fuel leakage is returned to the fuel system. However, the pipe 92 may lead to any zone of constant pressure substantially lower than the fuel line pressure, or to atmospheric pressure, so as to withdraw leakage from chamber 90. By this construction, the corrosive fuel oil or other liquid fuel is maintained out of contact with diaphragm 55, and can be conveniently confined by metallic parts formed of corrosion resistant metal so that long life is insured. It is to be noted that the cross sectional area of diaphragm 55 is materially greater than the cross sectional area of piston 74. Consequently, a high fuel oil pressure may be readily balanced by a comparatively low control fluid pressure.

In operation, valve 30 is normally maintained in an intermediate position by the pressure actuating mechanism, the pressure from control fluid line 37 being balanced by the pressure of liquid fuel from line 23. The valve thus floats in an intermediate position as determined by balanced pressures, so that it is freely responsive to changes in operating conditions, and functions with very little frictional drag. Any change in the outlet temperature of the oil at pyrometer 38 is communicated to the temperature controller 36, which accordingly adjusts the fluid pressure in line 37, temporarily disturbing the equilibrium balance, until a new position of equilibrium for the valve 30 is attained, which new position tends to restore the temperature at pyrometer 38 to the predetermined normal. Any local variation in pressure in line 23 arising from exterior sources independent of the temperature control, is communicated through line 42 and temporarily disturbs the pressure equilibrium, until a new position for valve 30 is reached at which pressure equilibrium is again attained, and which tends to restore the pressure in line 23 to that pressure which existed therein before the local variation occurred, and which serves to substantially maintain the predetermined outlet temperature of the oil.

While the invention is particularly described as applicable to a temperature control for an oil tube still, it is to be understood that the invention is applicable to the temperature control of a fluid heater generally. The pressure balanced valve may also be employed for control of the supply of fluid under pressure through a conduit in response to both the pressure within the conduit and to some external condition which is being controlled. Where a gaseous fuel is used for combustion at the burners, the return line 31 may be dispensed with, and the pressure actuated valve used as a control and shut off valve intermediate the pump 22 and the burners. In such case, when the valve 30 is closed or partially closed, a fluid pump 22 of the centrifugal or other suitable type may run continuously by simply building up a pressure in the fuel line until this pressure and the back pressure through the pump balance, as is well understood.

Obviously many modifications and variations of the invention, as hereinbefore set forth, may be made without departing from the spirit and scope thereof, and therefore only such limitations should be imposed as are indicated in the appended claims.

We claim:

1. In a fluid heater, having a burner for heating the fluid, and a fuel line for supplying fuel to the burner; a valve in said fuel line regulating the supply of fuel to said burner, a thermostat responsive to the temperature of the fluid being heated, a diaphragm mechanically connected to said valve, control fluid means for actuating said diaphragm controlled by said thermostat, a cylinder, a piston operating in said cylinder mechanically connected to said valve, and a pressure fluid connection between said fuel line and said cylinder for actuating said piston, whereby the positioning of said valve is jointly responsive to the temperature of said fluid being heated, and to the pressure of the fuel supplied to said burner.

2. In a control system of the character described, having a fluid to be heated, and a supply line for a heating medium for heating said fluid; a control valve in said supply line regulating the supply of heating medium for heating said fluid, a thermostat responsive to the temperature of the fluid being heated, a diaphragm mechanically connected to said valve, control fluid means actuating said diaphragm controlled by said thermostat, a cylinder, a piston operating in said cylinder, mechanically connected to said valve, and a connection between said supply line and said cylinder responsive to the pressure of the heating medium in said supply line for actuating said piston, whereby the positioning of said valve in said supply line is jointly responsive to the temperature of the fluid being heated and to the pressure of said heating medium within said supply line.

LUIS DE FLOREZ.
JAMES W. GRAY
EMMON BACH.